United States Patent [19]

Banerjee

[11] Patent Number: 5,264,093

[45] Date of Patent: * Nov. 23, 1993

[54] IRRADIATION OF CATION EXCHANGE MEMBRANES TO INCRESE CURRENT EFFICIENCY AND REDUCE POWER CONSUMPTION

[75] Inventor: Shoibal Banerjee, Newark, Del.

[73] Assignee: E. I. Du Pont de Nemours and Company, Wilmington, Del.

[*] Notice: The portion of the term of this patent subsequent to Jul. 7, 2009 has been disclaimed.

[21] Appl. No.: 878,406

[22] Filed: Apr. 30, 1992

[51] Int. Cl.$^5$ .......................... C25B 13/00; C08J 5/00
[52] U.S. Cl. .................. 204/157.15; 204/296; 521/27; 430/286; 430/287; 522/153; 522/2
[58] Field of Search .................. 204/157.15, 296; 521/27, 25; 522/2, 102, 103, 112, 149, 153; 430/281, 286, 287; 252/182.13, 182.17, 182.18

[56] References Cited

U.S. PATENT DOCUMENTS

| | | | |
|---|---|---|---|
| 3,282,875 | 11/1966 | Connolly et al. | 260/29.6 |
| 3,718,627 | 2/1973 | Grot | 260/79.3 MU |
| 4,012,303 | 3/1977 | D'Agostino et al. | 204/159.17 |
| 4,107,005 | 8/1978 | D'Agostino et al. | 204/98 |
| 4,113,922 | 4/1978 | D'Agostino et al. | 429/33 |
| 4,138,426 | 2/1979 | England | 260/465.6 |
| 4,282,795 | 8/1981 | Beretta | 89/148 |
| 4,287,032 | 9/1981 | Pellegri | 204/128 |
| 4,349,422 | 9/1982 | Maloney | 204/98 |
| 4,429,435 | 2/1984 | Walls | 17/1 S |
| 4,437,951 | 3/1984 | Bissot et al. | 204/98 |
| 4,439,292 | 3/1984 | Klotz et al. | 204/165 |
| 4,506,035 | 3/1985 | Barnett et al. | 521/53 |
| 4,595,476 | 6/1986 | Bissot | 204/252 |
| 4,602,045 | 9/1986 | Markus et al. | 521/27 |
| 4,661,218 | 4/1987 | Oda et al. | 204/98 |
| 5,128,014 | 7/1992 | Banerjee | 204/296 |

FOREIGN PATENT DOCUMENTS

| | | |
|---|---|---|
| 057065B | 1/1981 | European Pat. Off. . |
| 0133257 | 12/1978 | Fed. Rep. of Germany . |
| 50-13285 | 2/1975 | Japan . |
| 51-131487 | 11/1976 | Japan . |
| 54-26976 | 2/1979 | Japan . |
| 56-100638 | 8/1981 | Japan . |
| 56-44098 | 10/1981 | Japan . |
| 60-55033 | 3/1985 | Japan . |

Primary Examiner—Kathryn Gorgos
Attorney, Agent, or Firm—Cary A. Levitt

[57] ABSTRACT

The present invention is a process for modifying a fluorinated cation exchange membrane by irradiation of the membrane in its salt form with a sufficient dose of non-spark-producing radiation to increase the current efficiency in the use of the membrane for electrolyzing sodium chloride solution to produce high concentrations of caustic.

5 Claims, 4 Drawing Sheets

IRRADIATION OF CATION EXCHANGE MEMBRANES TO INCRESE CURRENT EFFICIENCY AND REDUCE POWER CONSUMPTION

FIELD OF THE INVENTION

This invention is concerned with irradiation of fluorinated cation exchange membranes used in electrolytic cells to increase current efficiency and reduce power consumption when producing high concentrations of caustic.

BACKGROUND OF THE INVENTION

The state-of-the-art method for electrolyzing an alkali metal halide, especially sodium chloride (NaCl) or potassium chloride (KCl), is to use a fluorinated membrane to separate the anolyte and catholyte compartments of an electrolytic cell. The membrane permits the alkali metal cation to pass through to the catholyte, but severely restricts the undesirable passage of hydroxyl ion from the catholyte to the anolyte. To make membrane electrolysis attractive, the power consumption should be minimized, which means that the current efficiency should be maximized, and the resistance should be minimized.

Many efforts have been made to improve the performance of these membranes, particularly membranes used in chloralkali cells, by a wide variety of treatments. Most of the efforts have been aimed at obtaining lower voltage, higher current efficiency or lower power consumption.

When producing high concentrations of caustic, for example, 36% to 45% caustic, the chloralkali cell generally operates at a higher cell voltage and lower current efficiency than that of a cell producing lower concentrations of caustic. The elevated cell voltage is one factor that makes the electrolytic production of high concentrations of caustic cost prohibitive. Thus, one emphasis is on increasing current efficiency and lowering power consumption.

Variations in the voltage of the electrolyte cell have a direct affect on power consumption. Voltage cycles of as little as 30-50 mV can upset the balance of heat. If constant temperature is not maintained, the membrane will not operate under equilibrium conditions, and power consumption may be undesirably affected. Any voltage over that needed to electrolyze brine is lost as heat; the result is a waste of electric power. Similarly, excessive heat production can limit electrolyzer productivity by raising cell temperatures and increasing gas volume. Also, the rectifiers used in chloralkali plants are rated for power, which is the product of voltage and amperage. At higher voltages, less amperage can be supplied, thereby reducing the productivity of the electrolyzers.

Changes in cell voltage present other problems, as well. For example, small fluctuations in cell voltage can lead to an unsteady current density within the membrane which may lead to an undesirable increase in power consumption. Likewise, if the membrane is not operated under equilibrium conditions, water transport may be affected which could cause undesirable changes in concentrations of caustic.

It is known that the irradiation of a fluorinated cation exchange membrane may improve cell voltage. U.S. patent application Ser. No. 07/663,003 (allowed but not issued) filed by this inventor discloses and claims a process for irradiating a fluorinated cation exchange membrane. However, this patent does not teach or disclose a process for irradiating cation exchange membranes used to produce caustic at concentrations as high as 45% at high current efficiency and low power consumption.

As noted above, it is especially important to improve cell current efficiency and power consumption in electrolytic cells used to produce high concentrations of caustic.

SUMMARY OF THE INVENTION

In the present invention, a fluorinated cation exchange membrane is irradiated with a non-spark-producing ionizing radiation. The membrane is irradiated with a dose of radiation sufficient enough to provide higher current efficiency and lower power consumption in an electrolytic cell used to produce high concentrations of sodium hydroxide (NaOH) in the range of about 36-45 weight percent.

DETAILED DESCRIPTION OF THE INVENTION

Figure 1:
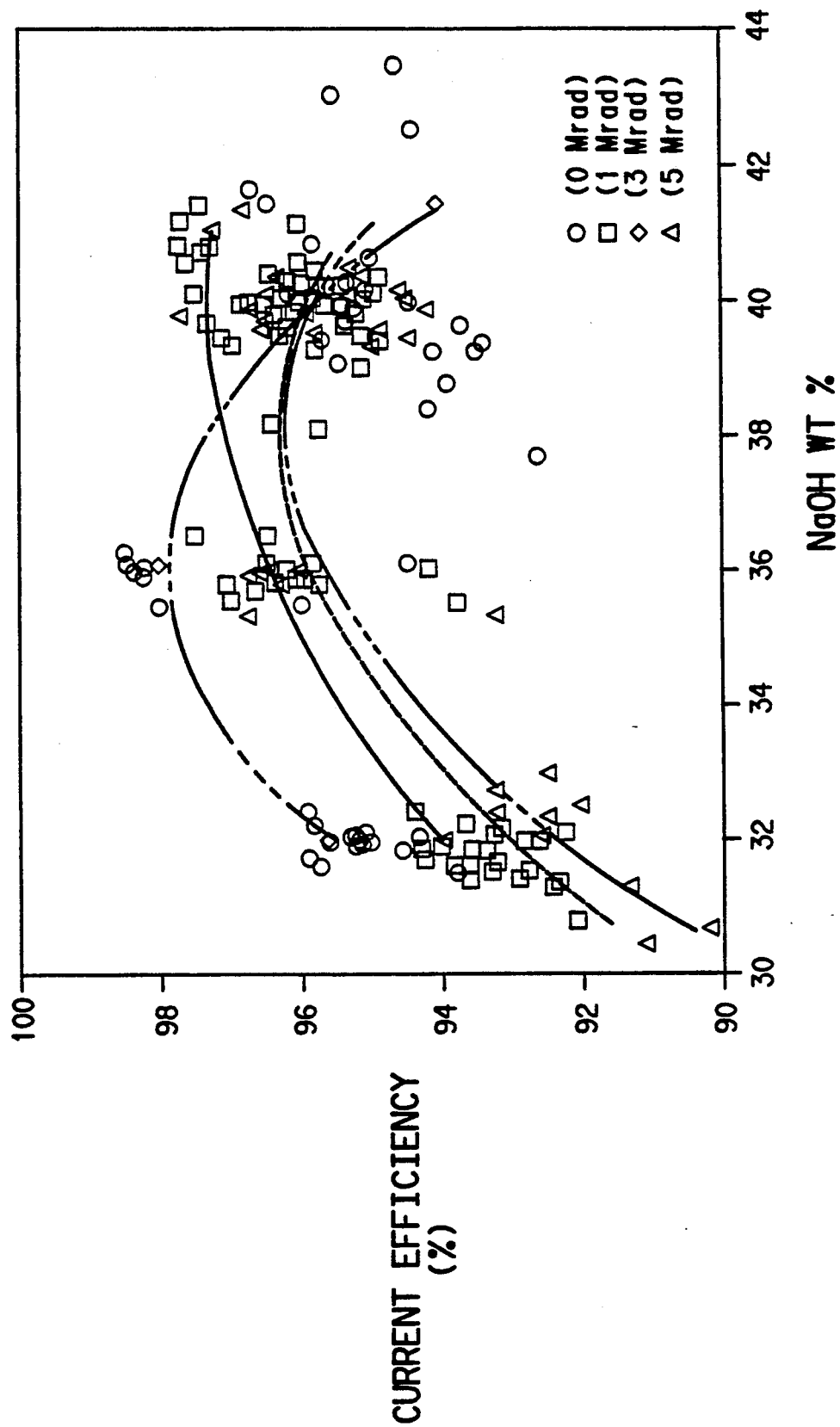
FIG. 1 shows a graph of current efficiency vs. weight percent of caustic at different doses of radiation.

The process for modifying a fluorinated cation exchange membrane for use in an electrolytic cell used to produce high concentrations of alkali metal halide solutions, primarily sodium hydroxide or potassium hydroxide involves irradiating the membrane with a non-spark-producing ionizing radiation. The sources of this type of radiation include but are not limited to (1) gamma sources, such as Co-60 and Cs-137, (2) beta sources (often referred to as electron beam accelerators or linear accelerators, and (3) x-rays. All ionizing radiation produces free radicals in the absorbing medium (the material being irradiated). The behavior of the free radicals produced is determined by the nature of the absorbing medium. The main difference between these three sources is the manner in which the radiation travels through the material being irradiated.

The most common sources of gamma radiation are Co-60 and Cs-137. Co-60 is made by pre-forming non-radioactive Co into rods or bars, then subjecting them to a neutron source such as the neutrons produced in a nuclear power plant.

Gamma radiation is emitted in a complete sphere, requiring the target material to completely surround the source if all of the irradiation is to be utilized. Gamma radiation is absorbed on a logarithmic basis as it travels in a material. In order to get a more uniform dose in the material, double sided exposure may be used, but is not necessary with a relatively thin material such as a chloralkali membrane. Gamma rays have a major advantage, penetration. This is not important in irradiating thin membranes.

The major disadvantages of radioactive sources are (1) high maintenance costs (replacement of source material), (2) the need for extreme safety precautions, (3) relatively low dose rate, and (4) the problems associated with transporting, storing and disposing of highly radioactive substances. In addition, since the radioactive decay cannot be controlled (turned on and off), the facility must be operated continuously to realize a high efficiency.

The x-rays are produced when high energy electrons are used to bombard metals. The efficiency of the x-ray source is determined by the molecular or atomic weight of the target and by the energy (accelerating voltage) of the electrons. The higher the molecular weight of the target material, the greater the efficiency. The efficiency is also proportional to the accelerating voltage. The penetration characteristics of x-rays are 5-20% greater than those of gamma rays.

The source of beta radiation is an electron beam accelerator. Electrons can be accelerated by (1) high DC voltages, (2) electric pulses, (3) magnetic pulses, or (4) a combination of these three. Cockcroft-Walton, isolated core, resonant transformer, DYNAMITRON (high voltage generated by a set of cascade rectifiers coupled to an oscillator), KLYSTRON (evacuated electron beam generator) and linacs are some of the names given to the techniques of producing high voltages. Absorption of high energy electrons in material is such that 90% of the beam energy may be used with a maximum to minimum dose ratio of 1.4 using a single pass under the beam.

The main advantages of the electron beam accelerators are the (1) high power and high throughput, (2) relatively low unit cost, (3), high dose rate, and (4) intrinsic safety. In addition, since electron accelerators may be turned off, the facilities do not have to be operated continuously. The main disadvantage of electron beam accelerators is the relatively small penetration of the electrons, about 2.1 cm in water for a 5 megarad source. This is not a significant disadvantage for irradiation of membranes, which are thin. Therefore, electron beam accelerators are the preferred source of ionizing radiation for this invention.

The membranes treated in this invention may be any membrane in hydrolyzed form known in the art for electrolysis of chloride salts. By hydrolyzed form, it is meant to include sulfonate or carboxylate salts and sulfonic and carboxylic acids.

In the irradiation process, the membrane is exposed to irradiation for a sufficient time and at a sufficient dose rate to cause an increase in current efficiency and thus a decrease in power consumption when the membrane is used for electrolysis of NaCl or KCl to produce high concentrations of sodium hydroxide or potassium hydroxide, respectively. The total dosage should be at least 0.1 megarads, preferably 1.0 megarad, most preferably 0.1-2.0 megarads. Dosage higher than 2 megarads is possible, as can be seen in the Figures, but does not provide further improvement in the properties of the membrane.

The total dosage is a function of the time of each exposure, the dose rate, and the number of exposures. Preferably, the number of exposures should be low, most preferably one. The dose rate will depend on the type of radiation used, the device used to generate the radiation, and the energy input to the source of radiation. For a given dose rate, the time of exposure can be varied to provide the preferred total dosage. A preferred way of controlling the time of exposure is to vary the speed of a conveyor system carrying the membrane through the irradiation zone.

The irradiated membrane is useful broadly in the chloralkali industry for providing a more efficient and economical operation of chloralkali cells. For example, for a plant producing 1,000 metric tons of caustic per day, operating at a voltage of 3.6 and a current efficiency of about 95% with power costs of $0.03/kWh, there is an annual saving of about $9,000,000 per year for each increase in current efficiency of 1%. Beyond the actual monetary savings, there is a corresponding savings in the world's energy reserves.

The membrane used in this invention is fluorinated, which means that at least 90%, preferably at least 95%, and most preferably all of the atoms attached to the carbons are F atoms or side-chain ether groups, which may contain functional groups hydrolyzable to salts. The non-fluorine atoms, if used, may be H, Cl, or Br.

Preferably, the membrane used in the electrolytic cells according to the process of this invention consists of at least two layers, where at least the one layer in contact with the anolyte having pendant sulfonyl groups.

The sulfonyl polymers of which at least one membrane layer in contact with the anolyte according to this invention can be made are fluorinated polymers with side chains containing the group $-CF_2CFR'SO_2X$ wherein $R'$ is F, Cl, $CF_2Cl$ or a $C_1$ to $C_{10}$ perfluoroalkyl radical, and X is F or Cl, preferably F. Ordinarily, the side chains will contain $-OCF_2CF_2CF_2SO_2X$ or $-OCF_2CF_2SO_2F$ groups, preferably the latter. The perfluorinated polymers are preferred.

The salt-form carboxylic polymers of which the membrane layer in contact with the catholyte is made have a fluorinated hydrocarbon backbone chain to which are attached side chains carrying, before hydrolysis to the salt form, certain functional groups hydrolyzable in an alkaline medium to carboxylate groups, such as nitrile or ester groups.

The polymers herein and the corresponding methods of polymerization are well known and described in the prior art.

The copolymers used in the manufacture of membrane layers used in the process of the present invention should be of high enough molecular weight to produce films which are self-supporting in both their melt-fabricable (precursor) form and in the hydrolyzed ion exchange form.

A membrane having at least one layer of a copolymer having sulfonyl groups in melt-fabricable form and a layer of a copolymer having carboxyl group in melt-fabricable form, such as made by coextrusion, can be used as one of the component films in making, by hydrolysis, the membrane to be used in the process of the present invention. Such a laminated structure will be occasionally referred to herein as a bimembrane. Bimembranes are well known in the art.

It is in fact preferred to use in the present process a carboxylate/sulfonate bimembrane, and it is possible for the sulfonate layer to have an equivalent weight lower than that of the carboxylate layer by at least 50 units.

It is also possible to use an all-carboxylate membrane with a layer of lower equivalent weight on the anolyte side.

The membrane used in this invention may also comprise three layers, for example:

a) on the catholyte side, a carboxylate layer of a 5-50 micrometer thickness, preferably 20-40 micrometers, with an equivalent weight suitable to provide a water transport of 3.0-4.0 moles of water per gram-atom of Na, b) in the middle, an optional carboxylate layer with a lower equivalent weight and a thickness in the same range, as that of (a), and c) on the anolyte side, a sulfonate layer of a 50-250 micrometer thickness, preferably 75-100 micrometers.

Membranes usually have an overall thickness of 50-300 micrometers, especially 125-200 micrometers.

For use in electrolysis of brine to produce high concentrations of caustic, the membrane should have all of the functional groups converted to ionizable functional groups. These will be sulfonate and carboxylate groups, preferably the sodium or potassium salts thereof.

The irradiation process is useful for membranes in the hydrolyzed form. Conversion to ionizable functional groups is ordinarily and conveniently accomplished by hydrolysis with acid or base, such that the various functional groups described above in relation to the melt-fabricable polymers are converted respectively to the free acids or the sodium salts thereof. Such hydrolysis can be carried out in an aqueous bath of either a mineral acid or sodium hydroxide. Alkaline hydrolysis is preferred as it is faster and more complete. Use of hot hydrolysis baths, such as near the boiling point of the solution, is preferred for rapid hydrolysis. The time required for hydrolysis increases with the thickness of the structure. It is advantageous to include in the hydrolysis bath a water-miscible organic compound such as, e.g., dimethyl sulfoxide, to swell the membrane and thus increase the rate of hydrolysis.

The membrane may be unreinforced film or bifilm, but for dimensional stability and greater notched tear resistance, it is common to use a reinforcing material. It is customary to use a fabric made of a fluorocarbon resin such as polytetrafluoroethylene or a melt-processable copolymer of tetrafluoroethylene with hexafluoropropylene or with perfluoro(propyl vinyl ether). These may be woven into fabric using various weaves, such as the plain weave, basket weave, leno weave, or others. Relatively open weaves are preferred because the electric resistance is lower. A porous sheet may be used as a support. Other perhalogenated polymers such as polychlorotrifluoroethylene may also be used, but perfluorinated supports have the best resistance to heat and chemicals. The fibers used in the support fabrics may be monofilaments or multifilament yarns. They may be of ordinary round cross-section or may have specialized cross-sections. Oblong or rectangular cross-sections, if suitably oriented to the membrane, make it possible to get more reinforcing action with a thinner overall membrane. It may be desirable to use sacrificial fibers such as rayon, paper, or polyester, along with the fluorocarbon fibers. Care should be taken, however, not to have the soluble or degradable fibers extend from one surface to the other, otherwise the nonporous membrane may become a porous diaphragm, and the caustic product may contain too much salt. Even with a cloth or mesh of fluorocarbon fibers, it is preferred not to have the cloth penetrate the surface of the membrane on the cathode side. The fabric employed may be calendered before lamination to reduce its thickness. In a bimembrane, the fabric may be in the sulfonate or carboxylate layer, or in both, but is more often in the sulfonate layer, which is usually thicker. In place of fabric, fibrils can be used.

The membrane or bimembrane may be used flat in various known filter press cells, or may be shaped around an electrode. The latter is especially useful when it is desired to convert an existing diaphragm cell to a membrane cell in order to make higher quality caustic.

Membranes can be swelled with polar solvents (such as lower alcohols or esters, tetrahydrofuran, or chloroform) and then dried, preferably between flat plates, to improve their electrolytic performance. Before mounting in commercial cell support frames, which may be 1-5 meters on a side, the membrane can be swelled so that it will not wrinkle after it is clamped in the frame and exposed to electrolytic fluids. Among the swelling agents that can be used are water, brine, sodium bicarbonate solution, caustic, lower alcohols, glycols, or mixtures thereof.

The cell can have two or three compartments, or even more. If three or more compartments are used, the membrane is commonly placed next to the cathode compartment, and the other dividers may be porous diaphragms or membranes based on polymers having pendant side chains with terminal $—CF_2—SO_3Na$ groups only. The cells may be connected in series (so-called bipolar cells) or in parallel (so-called monopolar cells). The membrane may be disposed horizontally or vertically in the cell, or at any angle from the vertical.

Any of the conventional electrodes or electrode configurations may be used. The anode should be resistant to corrosion by brine and chlorine and to erosion and preferably should contain an electrocatalyst to minimize chlorine overvoltage. A commercially available anode known as dimensionally stable anode (or DSA) is one of those that are suitable. A suitable base metal is titanium, and the electrocatalysts include reduced platinum group metal oxides (such as Ru and the like), singly or in mixtures, optionally admixed with a reduced oxide of Ti, Ta, Cb, Zr, Hf, V, Pt, or Ir. The electrocatalysts may be heat-treated for stability.

The anode may be a "zero-gap" anode, against which the membrane is urged and which anode is permeable to both liquids and gases. The anode may be kept a small distance from the membrane by the use of a spacer, against which the membrane is urged by a small hydraulic head on the other side of the membrane. The spacer may be made of a plastic which is resistant to the chemicals in the anolyte, such as polytetrafluoroethylene, ethylene/tetrafluoroethylene copolymer, or polychlorotrifluoroethylene. It is desirable that the spacer or the electrode have open vertical channels or grooves to facilitate the escape of gas evolved at the anode. Whether or not there is a spacer, it may be desirable to have the anode openings slanted, so that the gas is carried away from the membrane, and anolyte circulation past the membrane is maximized. This effect can be augmented by using downcomers for anolyte which has been lifted by the rising gas bubbles. The anode may be a screen or perforated plate or powder which is partially embedded in the anode surface layer of the bimembrane. In this case, the current may be supplied to the anode by current distributors which contact the anode at numerous closely-spaced points. The anode may be a porous catalytic anode attached to or pressed against the membrane or attached to or pressed against a porous layer, which is in turn attached to or pressed against the membrane.

The cathode should be resistant to corrosion by the catholyte, resistant to erosion, and preferably will contain an electrocatalyst to minimize hydrogen overvoltage. The cathode may be, e.g., mild steel, nickel, or stainless steel, and the electrocatalyst may be platinum black, palladium, gold, spinels, manganese, cobalt, nickel, Raney nickel, reduced platinum group metal oxides, alpha-iron, or the like.

The cathode may be a "zero-gap" cathode, against which the membrane is urged and which cathode is permeable to both liquids and gases. The cathode may be kept a small distance from the membrane by the use of a spacer, against which the membrane is urged by a small hydraulic head on the other side of the membrane. In the case of a three-compartment cell, both membranes may be urged against electrodes or spacers by a hydraulic head on the center compartment. The spacer may be made of a plastic which is resistant to the chemicals in the catholyte, such as polytetrafluoroethylene, ethylene/tetrafluoroethylene resin, or polychlorotrifluoroethylene. It is desirable that the cathode spacer or electrode have open vertical channels or grooves to facilitate the escape of gas evolved at the cathode. Whether or not there is a spacer, it may be desirable to have the cathode openings slanted so the gas is carried away from the membrane and catholyte flow past the membrane is maximized. This effect may be augmented by using downcomers for catholyte which has been lifted by rising gas bubbles. The cathode may be a porous cathode, pressed against the membrane or pressed against a porous layer, which is in turn attached to or pressed against the membrane.

An oxygen cathode can be used, in which oxygen is supplied to the cathode and substantially no hydrogen is evolved, with lower cell voltage as a result. The oxygen may be supplied either by bubbling through the catholyte and against the cathode, or by feeding oxygen-containing gas through a porous inlet tube which also serves as cathode and is coated with electrocatalyst.

It has long been known that it is desirable in the electrolysis of brine to use sodium chloride of low Ca and Mg content. It is also well known how to remove hardness from sodium chloride solutions to very low levels. Heavy metals like iron and mercury and foreign anions such as iodide should also be substantially removed. Some of the contaminants in make-up brine can be removed by passing the brine through a diaphragm cell before it is fed to the membrane cell system. Further hardness reductions can be achieved by passing the brine through a chelate ion exchanger, preferably one containing —$NHCH_2COOH$ groups, or a phosphate may be added to the brine to precipitate insoluble salts.

Brine fed to the cell is usually close to its saturation concentration, which is about 26 wt. % both at room temperature and at about 80° C., but a slightly lower brine concentration is acceptable. Brine concentrations in the anolyte compartment are measured on exit brine. By the time the brine concentration is measured by hydrometer, the brine has usually cooled to close to room temperature.

The process used to start up an electrolytic cell used to produce high concentrations of caustic differs from the steady state process described above. First, the membrane is converted to the Na salt form by treatment with an aqueous solution of about 2% sodium hydroxide or sodium bicarbonate and is installed in the cell. The cell is charged with caustic at less than 35% NaOH concentration, preferably less than 32%, and with 15–26% brine, preferably about 18% brine, with pH equal to or greater than 2. The electrolyzer is heated to 65°–90° C., and flow of current is started gradually, so that the cell voltage does not exceed 4.0 V. Flow of saturated brine to the anolyte and water to the catholyte is started, and the operation is stabilized at 42–45% caustic, preferably 44%, for 129 days. Water feed to the catholyte is then stopped, and the concentration of exit brine is controlled at about 18%. Higher caustic concentration can be achieved by increasing the exit brine concentration.

Because a bimembrane or multi-layer membrane containing one or more sulfonate layers has lower electrical resistance than an all-carboxylate membrane, it can be operated at lower voltage or higher current density. Good results can be obtained at 2–5 kA/$m^2$, preferably 3–4 kA/$m^2$.

It is desirable to acidify the anolyte to minimize the formation of oxygen and chlorate at the anode. Overacidification is not as serious an error in the case of a carboxylate/sulfonate bimembrane as in the case of an all-carboxylate membrane, because the —$CF_2SO_3H$ group is a stronger acid than the —$CF_2COOH$ group, and the sulfonate form, —$CF_2SO_3^-$, resists conversion to the acid form by overacidification more strongly than does the carboxylate ion form. The free acids are to be avoided because they increase membrane voltage.

Anolyte acidity is normally adjusted to a pH value in the range of 1–5 by addition of hydrochloric acid or hydroben chloride to the recycle brine. Recycle brine may be concentrated by addition of solid salt and/or by evaporating or distilling water from the stream.

While membrane cells are frequently operated at approximately atmospheric pressure, there can be advantages to operating them at elevated pressure. While direct current is ordinarily used in membrane cells, one can also use pulsed direct current or half-wave alternating current or rectified alternating current or direct current with a square wave.

Brine electrolysis is normally carried out at a temperature of about 70°–110° C., preferably 80°–100° C. At temperatures above about 100° C., pressure cells should be used.

The anode and/or cathode surface of the membrane may be coated with a gas- and liquid-permeable porous non-electrode layer. Such non-electrode layer can be in the form of a thin hydrophilic coating and is ordinarily of an inert electroinactive or non-electrocatalytic substance. micrometers. A non-electrode layer ordinarily comprises an inorganic component and a binder; the inorganic component can be an inorganic compound which is chemically stable in hot concentrated caustic and chlorine, preferably tin oxide, titanium oxide, silicon carbide, or zirconium oxide. The particle size of the inorganic material can be about 0.01–10 micrometers, and preferably 0.1–5 micrometers. The coating density should be 1–10 g of coating per square meter of membrane, preferably 1–5 g/$m^2$.

The binder component in the non-electrode layer can be, for example, polytetrafluoroethylene, a fluorocarbon polymer at least the surface of which is hydrophilic by virtue of treatment with ionizing radiation in air, or a modifying agent to introduce functional groups such as —COOH or —$SO_3H$ or treatment with an agent such as sodium in liquid ammonia, a functionally substituted fluorocarbon polymer or copolymer which has carboxylate or sulfonate functional groups, or polytetrafluoroethylene particles modified on their surfaces with fluorinated copolymers having acid type functional groups. Such binder can be used in an amount of about from 10 to 50 wt. % of the non-electrode layer. In addition to the inorganic component and the binder, the dispersion used to apply the inorganic component can include a thickener such as methyl cellulose or polyvinyl alcohol and a small amount of nonionic surfactant.

Composite structures having non-electrode layers thereon can be made by various techniques known in the art, which include preparation of a decal which is then pressed onto the membrane surface, spray application of a slurry in a liquid composition (for example, dispersion or solution) of the binder followed by drying, screen or gravure printing of compositions in paste form, hot pressing of powders distributed on the membrane surface, and other methods disclosed in the art. Such structures can be made by applying the indicated layers onto membranes in melt-fabricable form, and by some of the methods onto membranes in ion-exchange form; the polymeric component of the resulting structures when in melt-fabricable form can be hydrolyzed in known manner to the ion-exchange form. Irradiation can be carried out before or after coating, provided the hydrolyzed form is irradiated.

On the anolyte side, the membrane may have a bubble release coating. One means of providing this gas-release coating is to provide a non-electrode coating as described above, which suitably may be $ZrO_2$. Another method is to create optimum surface roughness or smoothness by hot roll embossing or by embossing with a porous paper. When embossing with a porous paper, a release paper can be applied to an outer surface of the membrane prior to passing through a laminator used, for example, to incorporate a reinforcement in the membrane. Preferably, the resulting surface roughness is about 2–5 micrometers as measured, for example, with a Bendix Model 1020 profilometer.

Membranes which carry thereon one or more non-electrode layers can be employed in an electrochemical cell in a narrow-gap or zero-gap configuration as described above.

EXAMPLES

The invention will be further clarified by a consideration of the following examples, which are intended to be purely exemplary of the use of the invention.

EXAMPLE 1

The bifilms used in this example have the following layers which are adhered to one another: a 38 micrometer layer of a 6.4:1 mole ratio tetrafluoroethylene: $CF_2=CFOCF_2CF(CF_3)OCF_2CF_2COOCH_3$ copolymer on one side and a 100 micrometer layer of 6.58:1 mole ratio TFE: $CF_2=CFOCF_2CF(CF_3)OCF_2CF_2SO_2F$ copolymer on the other side. The bifilms were hydrolyzed by soaking in a solution of 14% KOH/30% dimethylsulfoxide/56% water at 80°–100° C. for 16 hours. Each bifilm was 30×41 cm and weighed about 31 g.

The hydrolyzed bifilms were irradiated with an electron beam at Irradiation Industries, Inc., Gaithersburg, Md. The equipment used for irradiation was a 3.0 million electron volt, 25 milliampere Dynamitron manufactured by Radiation Dynamics, Inc. The irradiation dosage for the hydrolyzed bifilms was chosen to be 0, 1, 3 or 5 megarads.

The irradiated membranes along with a control (0 megarad) were preswelled in 2 wt % NaOH solution and installed in identical laboratory electrolytic cells with an effective bifilm diameter of 7.5 cm. The carboxyl copolymer layer was on the cathode side and the sulfonyl copolymer layer was on the anode side. The cathode was mild steel, the titanium anode was activated with a coating containing ruthenium oxide, and the bifilm was urged against the anode by catholyte head. Highly purified NaCl solution was used in the anolyte. Electrolysis was carried out at 90° C. and 3.1 $kA/m^2$ current density to make 32–45 weight percent NaOH.

Tables 1, 2, 3 and 4 show the weight percent caustic, current efficiency and power consumption for membranes irradiated with doses of 0, 1, 3 and 5 megarads, respectively.

TABLE 1

| Properties of Membrane Without Irradiation (Control Bifilm) | | | |
|---|---|---|---|
| Days on Line | NaOH Wt % | Current Efficiency (%) | Power Consumption (kWH/MT) |
| 1.0000 | 31.810 | 94.610 | 2393.9 |
| 2.0000 | 31.600 | 93.860 | 2377.4 |
| 3.0000 | 32.010 | 95.180 | 2407.7 |
| 4.0000 | 31.950 | 94.270 | 2431.0 |
| 7.0000 | 32.430 | 95.840 | 2391.2 |
| 8.0000 | 32.210 | 95.740 | 2393.7 |
| 9.0000 | 32.000 | 95.180 | 2407.7 |
| 10.000 | 31.620 | 95.550 | 2391.4 |
| 15.000 | 31.510 | 95.360 | 2396.2 |
| 16.000 | 31.930 | 95.110 | 2409.5 |
| 17.000 | 31.980 | 94.930 | 2414.1 |
| 18.000 | 31.980 | 95.490 | 2406.9 |
| 21.000 | 32.070 | 95.030 | 2404.5 |
| 22.000 | 32.010 | 95.130 | 2394.9 |
| 23.000 | 31.900 | 95.200 | 2393.2 |
| 24.000 | 31.880 | 95.100 | 2388.6 |
| 25.000 | 35.330 | 95.940 | 2444.6 |
| 28.000 | 35.300 | 97.970 | 2380.2 |
| 29.000 | 36.020 | 98.170 | 2389.0 |
| 30.000 | 35.920 | 98.170 | 2389.0 |
| 31.000 | 35.970 | 98.300 | 2379.0 |
| 36.000 | 36.140 | 98.440 | 2389.3 |
| 38.000 | 36.060 | 98.360 | 2384.4 |
| 42.000 | 41.380 | 96.350 | 2573.2 |
| 43.000 | 40.700 | 95.820 | 2573.5 |
| 45.000 | 40.130 | 96.100 | 2545.1 |
| 50.000 | 40.230 | 95.010 | 2574.3 |
| 52.000 | 40.340 | 95.310 | 2566.2 |
| 57.000 | 39.800 | 95.290 | 2552.6 |
| 59.000 | 39.840 | 95.380 | 2550.2 |
| 64.000 | 41.600 | 96.650 | 2551.4 |
| 66.000 | 40.120 | 96.210 | 2535.2 |
| 71.000 | 39.410 | 95.600 | 2537.4 |
| 73.000 | 39.020 | 95.260 | 2539.4 |
| 78.000 | 39.330 | 94.010 | 2587.4 |
| 80.000 | 39.620 | 95.340 | 2558.3 |
| 85.000 | 32.720 | 90.780 | 2590.9 |
| 87.000 | 38.450 | 89.400 | 2705.8 |
| 92.000 | 38.380 | 94.130 | 2562.7 |
| 99.000 | 36.120 | 94.560 | 2509.3 |
| 101.00 | 42.380 | 94.430 | 2645.4 |
| 105.00 | 43.370 | 94.610 | 2680.8 |
| 106.00 | 43.050 | 95.470 | 2660.8 |
| 108.00 | 40.700 | 94.930 | 2614.6 |
| 113.00 | 39.700 | 93.620 | 2629.0 |
| 115.00 | 40.000 | 94.400 | 2610.1 |
| 120.00 | 39.420 | 93.400 | 2641.6 |
| 122.00 | 39.330 | 93.460 | 2635.6 |
| 129.00 | 38.800 | 93.870 | 2596.3 |
| 136.00 | 37.690 | 92.550 | 2618.8 |

TABLE 2

| Properties of Membrane Irradiated With 1 Megarad | | | |
|---|---|---|---|
| Days on Line | NaOH Wt % | Current Efficiency (%) | Power Consumption (kWH/MT) |
|  | 32.350 | 94.320 | 2387.1 |
| 2.0000 | 31.490 | 93.700 | 2388.6 |

TABLE 2-continued
Properties of Membrane Irradiated With 1 Megarad

| Days on Line | NaOH Wt % | Current Efficiency (%) | Power Consumption (kWH/MT) |
|---|---|---|---|
| 5.0000 | 31.840 | 94.250 | 2374.6 |
| 6.0000 | 31.680 | 93.290 | 2399.1 |
| 7.0000 | 31.940 | 94.010 | 2380.7 |
| 8.0000 | 31.710 | 94.220 | 2375.4 |
| 13.000 | 31.620 | 93.900 | 2383.5 |
| 14.000 | 31.850 | 93.430 | 2402.6 |
| 15.000 | 31.870 | 93.620 | 2397.8 |
| 16.000 | 31.660 | 93.700 | 2395.7 |
| 19.000 | 31.570 | 93.380 | 2396.8 |
| 20.000 | 31.640 | 92.900 | 2409.1 |
| 21.000 | 32.070 | 93.210 | 2401.1 |
| 22.000 | 32.190 | 93.660 | 2389.6 |
| 23.000 | 35.670 | 93.740 | 2444.7 |
| 26.000 | 35.660 | 97.000 | 2355.7 |
| 27.000 | 36.110 | 95.870 | 2397.4 |
| 28.000 | 36.400 | 96.690 | 2384.0 |
| 29.000 | 36.120 | 96.520 | 2388.2 |
| 34.000 | 36.550 | 97.410 | 2373.3 |
| 36.000 | 36.780 | 96.630 | 2399.4 |
| 40.000 | 40.840 | 97.460 | 2482.1 |
| 41.000 | 41.470 | 97.210 | 2502.2 |
| 43.000 | 40.750 | 96.980 | 2480.5 |
| 48.000 | 39.810 | 95.880 | 2481.0 |
| 50.000 | 40.090 | 96.730 | 2466.2 |
| 55.000 | 39.700 | 96.480 | 2458.7 |
| 57.000 | 39.500 | 96.970 | 2446.2 |
| 62.000 | 41.170 | 97.400 | 2476.7 |
| 64.000 | 39.680 | 97.200 | 2447.3 |
| 69.000 | 38.200 | 96.340 | 2441.4 |
| 71.000 | 38.080 | 95.680 | 2465.2 |
| 76.000 | 39.790 | 95.690 | 2507.0 |
| 78.000 | 40.220 | 96.030 | 2512.0 |
| 83.000 | 41.130 | 95.940 | 2542.3 |
| 85.000 | 40.070 | 96.850 | 2483.9 |
| 90.000 | 40.000 | 96.430 | 2494.7 |
| 97.000 | 39.550 | 96.310 | 2484.6 |
| 99.000 | 39.850 | 96.220 | 2495.2 |
| 103.00 | 40.720 | 97.100 | 2485.0 |
| 104.00 | 40.000 | 96.200 | 2508.3 |
| 106.00 | 40.090 | 96.000 | 2517.0 |
| 111.00 | 39.830 | 96.080 | 2507.9 |
| 113.00 | 39.720 | 95.260 | 2529.5 |
| 118.00 | 39.300 | 95.640 | 2523.7 |
| 120.00 | 40.370 | 94.840 | 2562.6 |
| 127.00 | 40.550 | 95.980 | 2530.1 |
| 134.00 | 40.080 | 95.640 | 2541.2 |

TABLE 3
Properties of Membrane Irradiated With 3 Megarads

| Days on Line | NaOH Wt % | Current Efficiency (%) | Power Consumption (kWH/MT) |
|---|---|---|---|
| 1.0000 | 31.390 | 92.280 | 2447.1 |
| 2.0000 | 31.320 | 92.340 | 2452.8 |
| 3.0000 | 30.760 | 92.070 | 2445.4 |
| 8.0000 | 31.540 | 93.020 | 2442.0 |
| 9.0000 | 32.080 | 92.250 | 2477.0 |
| 10.000 | 31.970 | 92.870 | 2460.4 |
| 14.000 | 32.000 | 92.680 | 2465.5 |
| 15.000 | 32.120 | 93.190 | 2452.0 |
| 16.000 | 32.060 | 93.280 | 2456.8 |
| 17.000 | 32.050 | 93.270 | 2457.1 |
| 18.000 | 36.070 | 94.140 | 2498.4 |
| 21.000 | 35.980 | 96.290 | 2442.6 |
| 22.000 | 35.880 | 96.080 | 2441.0 |
| 23.000 | 35.840 | 95.800 | 2455.1 |
| 24.000 | 35.880 | 96.420 | 2439.3 |
| 25.000 | 35.800 | 96.650 | 2426.6 |
| 28.000 | 35.880 | 97.020 | 2424.2 |
| 29.000 | 35.890 | 95.990 | 2450.3 |
| 31.000 | 35.970 | 96.250 | 2450.6 |
| 35.000 | 40.140 | 97.280 | 2514.2 |
| 36.000 | 40.050 | 96.620 | 2538.3 |
| 38.000 | 40.100 | 96.340 | 2545.7 |
| 43.000 | 40.210 | 96.150 | 2557.7 |
| 45.000 | 40.430 | 96.430 | 2550.3 |
| 50.000 | 39.900 | 96.150 | 2550.7 |

TABLE 3-continued
Properties of Membrane Irradiated With 3 Megarads

| Days on Line | NaOH Wt % | Current Efficiency (%) | Power Consumption (kWH/MT) |
|---|---|---|---|
| 52.000 | 39.430 | 96.400 | 2530.2 |
| 57.000 | 40.660 | 97.290 | 2527.7 |
| 59.000 | 39.410 | 96.790 | 2513.1 |
| 64.000 | 39.010 | 96.060 | 2539.2 |
| 66.000 | 39.080 | 94.920 | 2576.7 |
| 71.000 | 39.750 | 95.380 | 2585.4 |
| 73.000 | 40.100 | 95.900 | 2571.3 |
| 78.000 | 40.600 | 95.520 | 2588.6 |
| 80.000 | 40.140 | 95.680 | 2570.3 |
| 85.000 | 40.270 | 96.100 | 2566.0 |
| 92.000 | 40.040 | 95.570 | 2580.9 |
| 94.000 | 40.420 | 95.660 | 2582.7 |
| 98.000 | 40.070 | 95.060 | 2596.2 |
| 99.000 | 40.020 | 95.850 | 2574.8 |
| 101.00 | 40.090 | 94.980 | 2602.6 |
| 106.00 | 39.870 | 95.390 | 2585.1 |
| 108.00 | 39.890 | 95.560 | 2577.0 |
| 113.00 | 39.490 | 94.840 | 2600.1 |
| 115.00 | 39.630 | 95.380 | 2583.3 |
| 122.00 | 40.150 | 94.890 | 2595.2 |
| 129.00 | 39.530 | 95.080 | 2585.1 |

TABLE 4
Properties of Membrane Irradiated With 5 Megarads

| Days on Line | NaOH Wt % | Current Efficiency (%) | Power Consumption kWH/MT |
|---|---|---|---|
| 1.0000 | 30.120 | 85.320 | 2670.3 |
| 2.0000 | 30.480 | 91.220 | 2482.9 |
| 3.0000 | 30.550 | 90.170 | 2519.2 |
| 8.0000 | 31.280 | 91.500 | 2497.3 |
| 9.0000 | 32.410 | 91.990 | 2498.5 |
| 10.000 | 32.840 | 92.430 | 2501.1 |
| 11.000 | 32.510 | 93.180 | 2473.8 |
| 14.000 | 32.270 | 92.460 | 2493.1 |
| 15.000 | 32.210 | 93.210 | 2473.0 |
| 16.000 | 32.070 | 92.640 | 2488.2 |
| 17.000 | 32.070 | 92.670 | 2487.4 |
| 18.000 | 35.500 | 93.110 | 2547.6 |
| 21.000 | 35.530 | 96.720 | 2445.6 |
| 22.000 | 36.010 | 96.050 | 2476.6 |
| 23.000 | 36.020 | 96.450 | 2466.4 |
| 24.000 | 36.080 | 96.750 | 2465.6 |
| 25.000 | 36.120 | 96.560 | 2470.5 |
| 28.000 | 35.930 | 96.370 | 2475.4 |
| 31.000 | 36.100 | 96.640 | 2468.4 |
| 35.000 | 39.870 | 97.530 | 2514.6 |
| 36.000 | 39.820 | 96.530 | 2540.7 |
| 38.000 | 40.040 | 96.620 | 2538.3 |
| 43.000 | 40.270 | 96.470 | 2542.3 |
| 45.000 | 40.340 | 96.240 | 2555.3 |
| 50.000 | 39.980 | 95.570 | 2573.2 |
| 52.000 | 39.900 | 96.510 | 2534.3 |
| 57.000 | 41.340 | 96.710 | 2542.9 |
| 59.000 | 40.020 | 96.250 | 2527.2 |
| 64.000 | 39.490 | 95.670 | 2535.5 |
| 66.000 | 39.340 | 94.980 | 2561.0 |
| 71.000 | 39.620 | 94.850 | 2571.6 |
| 73.000 | 40.010 | 95.340 | 2572.4 |
| 78.000 | 40.480 | 95.180 | 2583.8 |
| 80.000 | 40.400 | 95.330 | 2579.7 |
| 85.000 | 40.170 | 95.110 | 2585.7 |
| 92.000 | 39.980 | 94.420 | 2604.6 |
| 94.000 | 40.380 | 95.060 | 2592.7 |
| 98.000 | 40.390 | 95.590 | 2565.7 |
| 99.000 | 39.950 | 95.770 | 2563.6 |
| 101.00 | 40.200 | 95.570 | 2572.5 |
| 106.00 | 40.060 | 95.290 | 2583.6 |
| 108.00 | 39.900 | 94.140 | 2618.7 |
| 113.00 | 39.470 | 94.360 | 2615.4 |
| 115.00 | 40.070 | 95.300 | 2590.3 |
| 122.00 | 40.520 | 95.170 | 2598.1 |
| 129.00 | 40.120 | 94.470 | 2615.2 |

FIG. 1 shows the variation of current efficiency with weight percent of caustic. The graph shows surprising improvement in current efficiency at higher concentrations of caustic. Moderate levels of radiation, e.g., 3-5 megarads, resulted in slight increases of current efficiency, and lower levels of radiation resulted in even greater increases in current efficiency.

Figure 2:
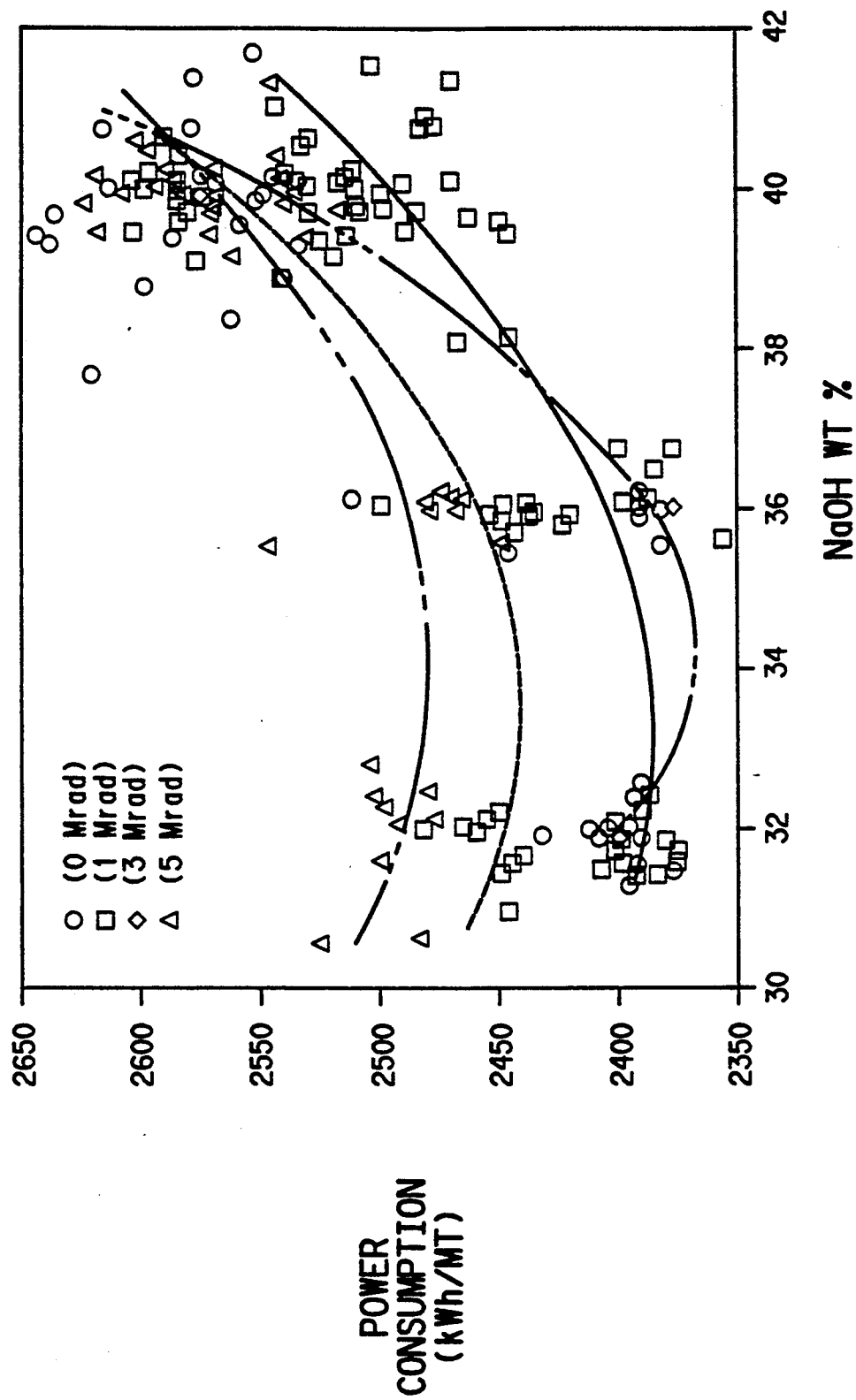
FIG. 2 shows a graph of power consumption in kilowatt hours/metric ton vs. weight percent of caustic at different doses of radiation.

FIG. 2 shows that variation of power consumption with percentages of caustic. Because power consumption depends in part on current efficiency, it is desirable to have high concentration efficiency in order to obtain the desirable low power consumption. From the curves in the diagram, it is evident that at higher concentrations of caustic, the use of moderate levels of radiation, e.g., 3-5 megarads, results in power consumption of slightly lower levels than the control bifilm, while the use of lower levels of radiation, e.g., 1 megarad, results in power consumption of significantly lower levels than those of the control bifilm.

EXAMPLE 2

In order to verify that the properties of the irradiated membrane were not lost at shutdown and restart, the cell used in this example was shutdown for 129 days. The membrane was treated with sodium hydroxide and installed into the cell. Then, the cell was charged with 32% NaOH and 17% brine at a pH of 9-10. The electrolyzer was heated to 90° C. and the flow current was started gradually and maintained at a current density of 3.1 kA/m$^2$. Flow of saturated brine to anode and water to the cathode was started, and the operation was stabilized at 44% caustic.

Tables 5, 6 and 7 show the weight percent caustic, current efficiency and power consumption for membranes irradiated with doses of 0, 1 and 3 megarads of radiation under restart conditions.

TABLE 5

Properties of Membrane Without Irradiation Under Restart Conditions

| Days on Line | NaOH Wt % | Current Efficiency (%) | Power Consumption kWH/MT |
|---|---|---|---|
| 3 | 33.34 | 93.0 | 2661.5 |
| 4 | 35.84 | 92.0 | 2730.3 |
| 5 | 37.97 | 92.2 | 2754.7 |
| 6 | 39.21 | 92.1 | 2773.6 |
| 7 | 39.35 | 92.4 | 2765.8 |
| 11 | 39.57 | 92.3 | 2775.8 |
| 12 | 39.52 | 92.2 | 2775.6 |
| 18 | 39.48 | 92.3 | 2790.2 |
| 19 | 39.57 | 92.5 | 2783.4 |
| 20 | 40.03 | 93.0 | 2774.3 |
| 24 | 39.58 | 92.3 | 2788.0 |
| 25 | 42.62 | 91.5 | 2882.3 |
| 26 | 42.77 | 92.2 | 2864.0 |
| 27 | 43.77 | 92.6 | 2867.9 |
| 28 | 43.80 | 88.6 | 2999.2 |
| 31 | 44.07 | 92.8 | 2805.6 |
| 32 | 44.35 | 92.9 | 2813.6 |
| 33 | 44.29 | 92.9 | 2819.7 |
| 34 | 43.83 | 92.6 | 2827.0 |
| 39 | 43.50 | 92.4 | 2857.8 |
| 41 | 42.85 | 91.4 | 2881.3 |
| 46 | 42.97 | 92.1 | 2864.7 |
| 47 | 43.32 | 92.1 | 2871.4 |
| 48 | 43.47 | 92.4 | 2864.6 |
| 53 | 44.01 | 93.2 | 2852.8 |
| 55 | 43.98 | 93.1 | 2867.3 |
| 60 | 43.70 | 92.1 | 2838.9 |
| 61 | 43.62 | 91.9 | 2846.2 |
| 63 | 43.59 | 92.1 | 2856.6 |
| 67 | 44.21 | 92.6 | 2881.8 |
| 69 | 44.02 | 92.2 | 2889.6 |
| 74 | 43.06 | 91.5 | 2897.6 |
| 76 | 43.41 | 91.8 | 2901.3 |
| 81 | 43.40 | 91.5 | 2931.5 |
| 82 | 43.51 | 91.6 | 2941.4 |

TABLE 5-continued

Properties of Membrane Without Irradiation Under Restart Conditions

| Days on Line | NaOH Wt % | Current Efficiency (%) | Power Consumption kWH/MT |
|---|---|---|---|
| 88 | 43.56 | 91.9 | 2933.3 |
| 90 | 43.74 | 92.0 | 2942.5 |
| 95 | 43.41 | 91.4 | 2957.4 |
| 97 | 43.78 | 92.0 | 2949.8 |
| 102 | 43.76 | 91.3 | 2974.8 |
| 104 | 43.85 | 91.3 | 2992.2 |
| 109 | 44.28 | 91.6 | 2989.2 |
| 111 | 44.09 | 91.4 | 2994.4 |
| 116 | 44.18 | 91.8 | 2953.5 |
| 117 | 44.14 | 91.6 | 2965.5 |
| 123 | 44.09 | 91.8 | 2949.6 |
| 125 | 44.09 | 91.7 | 2954.2 |
| 130 | 44.04 | 91.7 | 2960.9 |
| 132 | 43.99 | 91.6 | 2964.0 |

TABLE 6

Properties of Membrane Irradiated With 1 Megarad Under Restart Conditions

| Days on Line | NaOH Wt % | Current Efficiency (%) | Power Consumption kWH/MT |
|---|---|---|---|
| 3 | 36.38 | 93.7 | 2709.1 |
| 4 | 36.18 | 92.9 | 2732.1 |
| 5 | 37.25 | 93.6 | 2725.6 |
| 6 | 39.14 | 92.8 | 2773.6 |
| 7 | 39.34 | 92.9 | 2763.9 |
| 11 | 39.22 | 92.6 | 2779.1 |
| 12 | 39.42 | 93.0 | 2766.1 |
| 18 | 39.34 | 93.1 | 2768.2 |
| 19 | 39.31 | 93.1 | 2770.5 |
| 20 | 39.83 | 93.7 | 2760.4 |
| 24 | 39.56 | 93.1 | 2779.5 |
| 25 | 42.91 | 92.1 | 2866.8 |
| 26 | 43.24 | 92.9 | 2854.3 |
| 27 | 43.58 | 93.3 | 2844.6 |
| 28 | 43.71 | 93.4 | 2838.6 |
| 31 | 44.59 | 93.5 | 2802.7 |
| 32 | 44.94 | 93.5 | 2808.5 |
| 33 | 44.91 | 93.4 | 2810.0 |
| 34 | 44.56 | 93.2 | 2815.3 |
| 39 | 44.45 | 93.1 | 2829.1 |
| 41 | 44.42 | 93.1 | 2828.7 |
| 46 | 44.44 | 92.9 | 2840.5 |
| 48 | 44.44 | 93.2 | 2833.1 |
| 53 | 44.48 | 93.0 | 2840.2 |
| 55 | 44.79 | 93.6 | 2827.4 |
| 60 | 44.45 | 92.2 | 2843.8 |
| 61 | 44.59 | 92.5 | 2846.0 |
| 63 | 44.40 | 93.3 | 2808.6 |
| 67 | 45.00 | 93.4 | 2827.7 |
| 69 | 44.78 | 93.3 | 2833.2 |
| 74 | 43.89 | 92.9 | 2833.2 |
| 76 | 44.00 | 92.6 | 2846.1 |
| 81 | 43.99 | 93.1 | 2830.9 |
| 82 | 44.15 | 92.9 | 2838.8 |
| 88 | 43.68 | 92.3 | 2860.0 |
| 90 | 43.52 | 92.3 | 2860.9 |
| 95 | 43.80 | 93.1 | 2842.1 |
| 97 | 43.86 | 92.2 | 2871.8 |
| 102 | 43.90 | 92.7 | 2863.5 |
| 104 | 43.88 | 92.6 | 2867.1 |
| 109 | 43.93 | 92.8 | 2860.0 |
| 111 | 43.41 | 91.6 | 2892.3 |
| 116 | 44.00 | 92.1 | 2861.3 |
| 117 | 43.96 | 92.3 | 2864.7 |
| 123 | 44.05 | 93.1 | 2839.3 |
| 125 | 43.75 | 92.4 | 2866.2 |
| 130 | 44.05 | 92.6 | 2862.9 |
| 132 | 44.00 | 92.8 | 2855.9 |

TABLE 7

Properties of Membrane Irradiated With 3 Megarads Under Restart Conditions

| Days on Line | NaOH Wt % | Current Efficiency (%) | Power Consumption kWH/MT |
|---|---|---|---|
| 1 | 34.38 | 93.2 | 2752.1 |
| 4 | 40.11 | 92.4 | 2816.3 |
| 5 | 40.06 | 92.4 | 2812.1 |
| 6 | 39.86 | 91.7 | 2836.3 |
| 7 | 40.18 | 92.4 | 2809.0 |
| 8 | 40.33 | 92.6 | 2803.9 |
| 12 | 40.78 | 93.4 | 2777.1 |
| 13 | 40.12 | 92.2 | 2815.2 |
| 14 | 40.34 | 92.3 | 2814.2 |
| 19 | 40.25 | 92.5 | 2816.4 |
| 20 | 40.03 | 92.2 | 2832.0 |
| 21 | 40.96 | 91.5 | 2869.2 |
| 26 | 42.83 | 88.2 | 3044.9 |
| 27 | 42.80 | 88.1 | 3058.1 |
| 33 | 42.67 | 87.3 | 3097.2 |
| 35 | 42.43 | 87.0 | 3107.5 |
| 40 | 42.63 | 87.0 | 3114.4 |
| 42 | 42.53 | 87.0 | 3117.2 |

Figure 3:
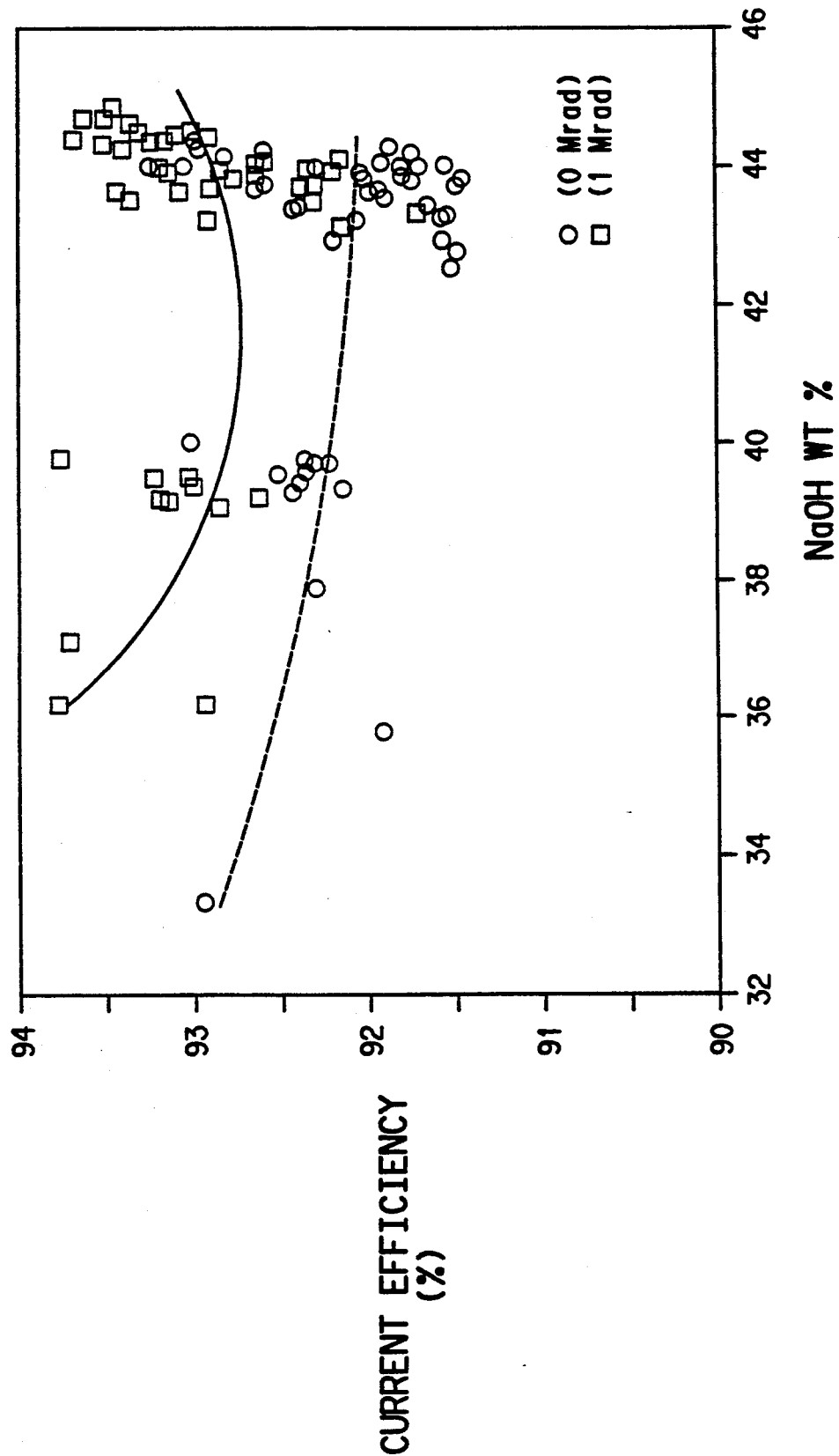
FIG. 3 shows a graph of current efficiency vs. weight percent of caustic under restart conditions at different doses of radiation.
Figure 4:
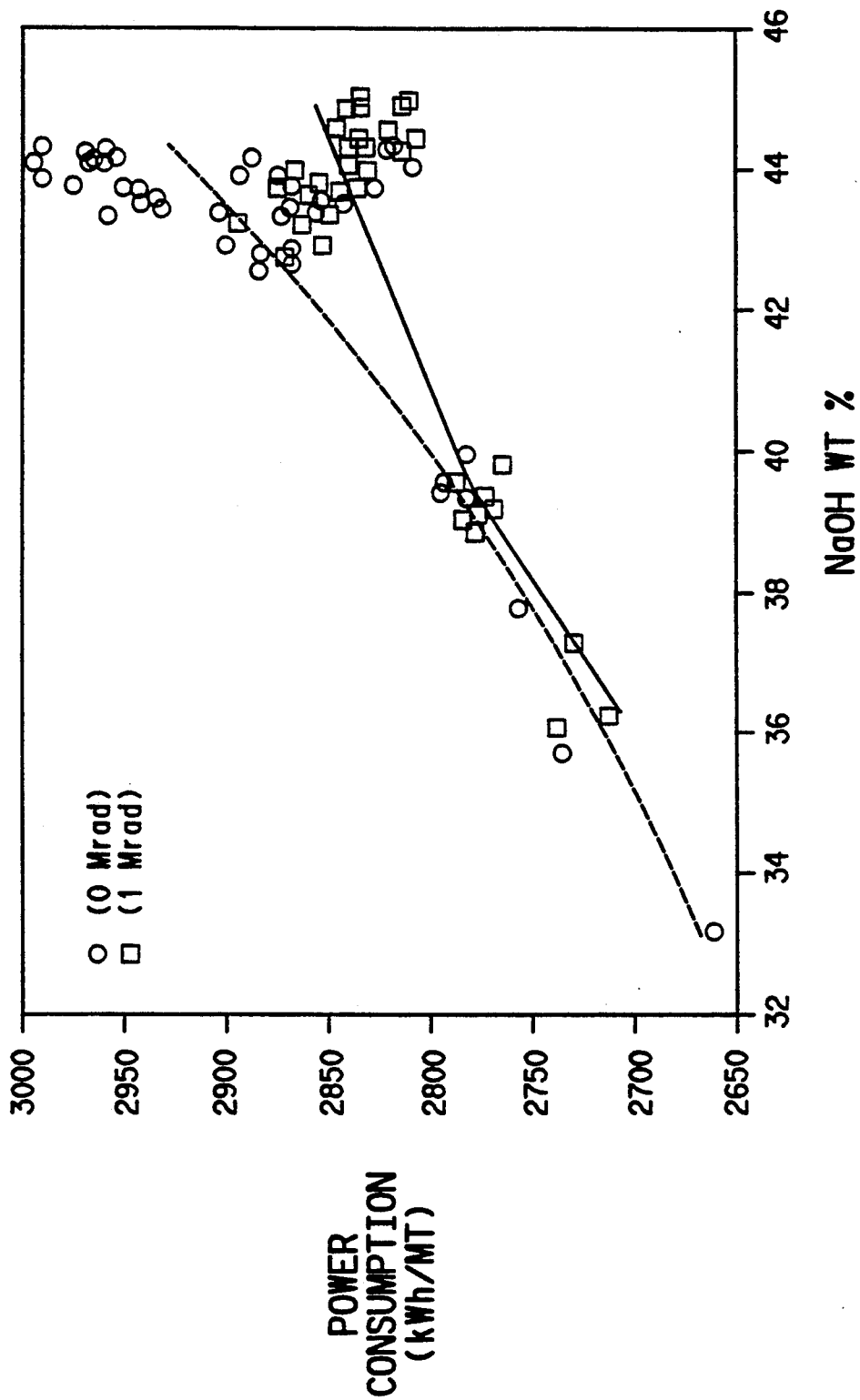
FIG. 4 shows a graph of power consumption in kilowatt hours/metric tons vs. weight percent caustic under restart conditions and at different doses of radiation.

FIGS. 3 and 4 show the favorable properties of the irradiated membrane after restart. In particular, FIG. 3 shows the surprising improvement in current efficiency at higher concentrations of caustic. The graph shows a decline in current efficiency at lower weight percents of caustic for the irradiated cell membranes, e.g., 34-39 wt %, and an increase in current efficiency at higher weight percents, e.g., 40-46 wt %.

Similarly, FIG. 4 shows surprising improvements in obtaining the desirably lower power consumption. The graph shows that at lower weight percents, power consumption for the irradiate membranes increases at slightly lower levels than the control cells. Conversely, it shows a significantly lower increase in power consumption at higher concentrations of caustic.

Other embodiments of the invention will be apparent to one skilled in the art from a consideration of this specification or practice of the invention disclosed herein. It is intended that the specification and examples be considered as exemplary only, with the true scope and spirit of the invention being indicated by the following claims.

I claim:

1. A process for modifying a fluorinated cation exchange membrane comprising irradiating said membrane in its salt form, in an environment substantially free of a monomer which would graft polymerize with components of said membrane, with a non-spark producing ionizing radiation with a dose sufficient to increase the current efficiency in the use of the membrane for the electrolysis of an alkali metal chloride solution used to produce sodium hydroxide wherein the concentration of sodium hydroxide is about 36%-45%.

2. The process of claim 1 wherein the dose is 0.5-5 megarads.

3. The process of claim 2 wherein the dose is achieved in a single exposure to the radiation.

4. A modified fluorinated cation exchange membrane used for the electrolysis of an alkali metal chloride solution used to produce sodium hydroxide, wherein the concentration of sodium hydroxide is about 36%-45%, made by the process of claim 1.

5. The membrane of claim 4 wherein the membrane comprises at least two layers.

* * * * *